(12) United States Patent
Parthasarathy et al.

(10) Patent No.: US 9,048,728 B2
(45) Date of Patent: Jun. 2, 2015

(54) SWITCH PAIRS BETWEEN RESISTOR NETWORK AND HIGH/LOW DC CONVERTER COMPARATOR INPUT

(71) Applicant: Texas Instruments Incorporated, Dallas, TX (US)

(72) Inventors: Harikrishna Parthasarathy, Bangalore (IN); Srinivas Venkata Veeramreddi, Saidabad (IN); Sudhir Polarouthu, Andhra Pradesh (IN); Baher S. Haroun, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 171 days.

(21) Appl. No.: 13/647,156

(22) Filed: Oct. 8, 2012

(65) Prior Publication Data

US 2014/0097810 A1    Apr. 10, 2014

(51) Int. Cl.
G05F 1/63    (2006.01)
H02M 3/156    (2006.01)

(52) U.S. Cl.
CPC .................................. H02M 3/1563 (2013.01)

(58) Field of Classification Search
CPC ..... H02M 3/156; H02M 3/157; H02M 3/158; H02M 3/1584; H02M 3/1588; H02M 3/33507; H02M 2001/0009; H02M 2001/0012; H02M 2001/0032

USPC ................. 323/282–285, 273, 274, 280, 281
See application file for complete search history.

(56) References Cited

U.S. PATENT DOCUMENTS

| | | | | |
|---|---|---|---|---|
| 7,605,576 B2* | 10/2009 | Kanabuko | | 323/285 |
| 8,493,042 B2* | 7/2013 | Kawagoe | | 323/271 |
| 8,593,123 B2* | 11/2013 | Chen et al. | | 323/284 |
| 8,618,779 B2* | 12/2013 | Garrett et al. | | 323/271 |
| 8,766,616 B2* | 7/2014 | Oyama | | 323/284 |
| 2009/0015230 A1* | 1/2009 | Alessandro et al. | | 323/285 |
| 2009/0322300 A1* | 12/2009 | Melanson et al. | | 323/284 |
| 2010/0320988 A1* | 12/2010 | Do | | 323/284 |
| 2012/0105031 A1* | 5/2012 | Kumagai | | 323/271 |
| 2013/0038305 A1* | 2/2013 | Arno et al. | | 323/282 |

* cited by examiner

Primary Examiner — Matthew Nguyen
Assistant Examiner — Kevin H Sprenger
(74) Attorney, Agent, or Firm — Lawrence J. Bassuk; Frank D. Cimino

(57) ABSTRACT

Two hysteresis levels, a high level and a low level, may be used to set a period (and the switching frequency) of the output voltage of a DC-DC converter, as well as the output ripple of the converter. These two thresholds may be changed using pairs of switches. By controlling the sequence and the duration of the on-time of the switches, spectral spurs in the output can be controlled and the amplitude and the frequency band of interest can be reduced. Additional spur reduction may be possible by randomizing the control of the switches.

4 Claims, 3 Drawing Sheets

SWITCH PAIRS BETWEEN RESISTOR NETWORK AND HIGH/LOW DC CONVERTER COMPARATOR INPUT

TECHNICAL FIELD

The present disclosure is generally related to electronics and, more particularly, is related to power management.

BACKGROUND

Pulse frequency modulation (PFM) is a switching method commonly used in many DC-DC voltage converters to improve efficiency at light loads. PFM is often used at light load currents and pulse width modulation (PWM) is used at heavier load currents. This type of operation allows the converter to maintain high efficiency over a wide range of output current. In PFM mode, the converter begins switching only when the output voltage falls below a lower threshold voltage value and continues to do so until it reaches an upper threshold value. Once the output reaches the higher threshold value, all unnecessary internal circuitry is turned off to reduce the quiescent current. This control method significantly reduces the quiescent current to a typical value of 20 µA, which results in a higher efficiency at light loads.

In PFM mode, a series of inductor current pulses are applied to the load and output capacitor to maintain the output voltage within preset boundaries. This mode effectively lowers the frequency of the switching-cycle events, thereby lowering the switching losses in the converter. There are several variations on PFM, such as single-pulse PFM, multipulse PFM and burst-mode PFM. However, all operate according to the basic principle of initiating switching cycles only as needed to maintain the output voltage. However, there are heretofore unaddressed needs with previous solutions in managing the spectral content of the output of the converter.

SUMMARY

Example embodiments of the present disclosure provide systems of tone management in hysteretic mode DC-DC converters. Briefly described, in architecture, one example embodiment of the system, among others, can be implemented as follows: a resistor divider; a plurality of switches; and a controller configured to switch the plurality of switches to adjust hysteresis levels of the feedback of an output of a pulse frequency modulated DC-DC converter.

Embodiments of the present disclosure can also be viewed as providing methods of tone management in hysteretic mode DC-DC converters. In this regard, one embodiment of such a method, among others, can be broadly summarized by the following steps: adjusting an output ripple and fundamental frequency of a pulse frequency modulation DC-DC converter, the adjusting comprising setting hysteresis levels for the output of the DC-DC converter.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 2:
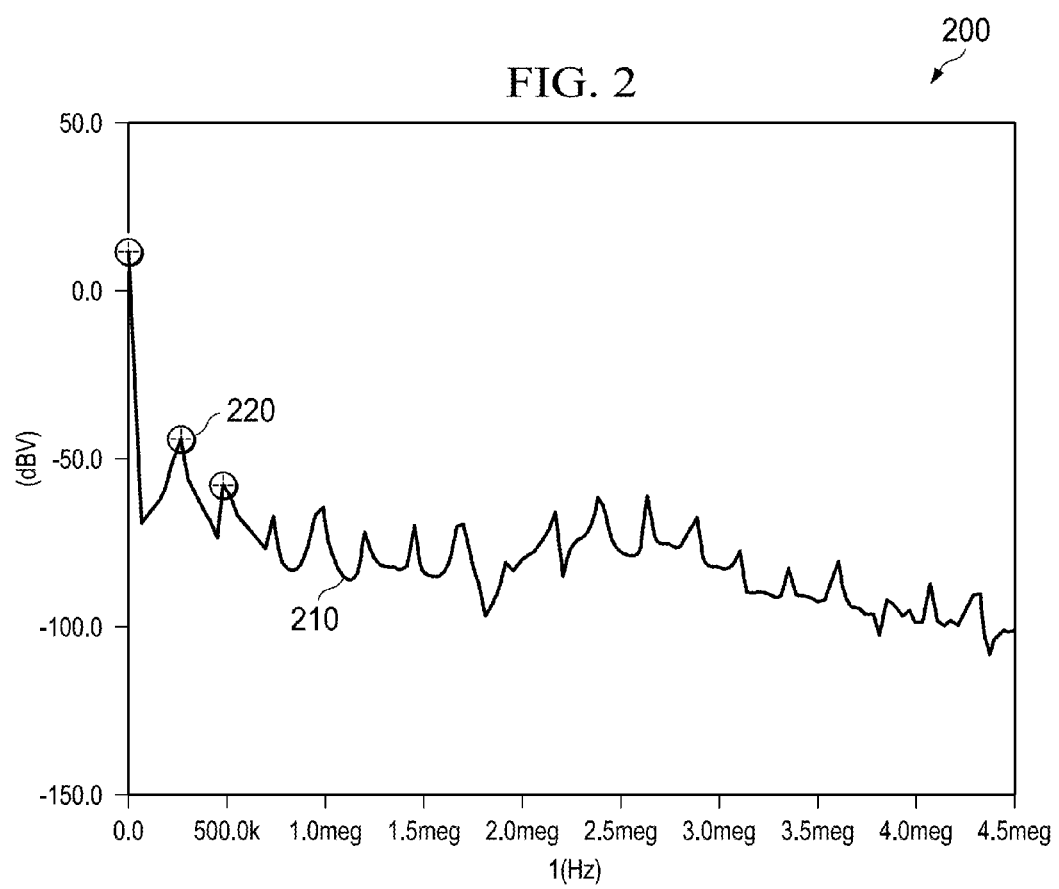
FIG. 2 is a signal diagram of the spectral content of the output of a typical PFM DC-DC converter.

Pulse frequency modulation (PFM) is often used as the mode of operation of a DC-DC converter at low loads due to its better efficiency as compared to pulse width modulation (PWM). Unlike in PWM mode, in PFM mode, the output spectral content is not well controlled. The spectral content is dependent on load current, input voltage, output voltage and external components and can potentially cause undesirable tones in radios that are powered by the DC-DC output voltage. FIG. 2 provides signal diagram 200 representing spectral content 210 of a PFM DC-DC converter. Undesirable tone 220 occurs at approximately 300 kHz, but will change depending on the aforementioned conditions, among others.

Figure 1:
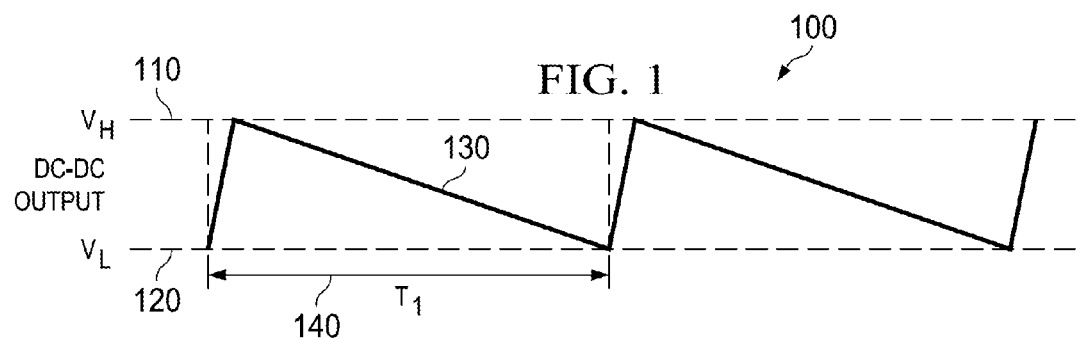
FIG. 1 is a signal diagram of an output of a typical PFM DC-DC converter.

As provided in signal diagram 100 of FIG. 1, two hysteresis levels, a high level $V_H$ 110 and a low level $V_L$ 120, may be used to set period 140 (and the switching frequency) of the output voltage of the converter as well as the output ripple of the converter. These two thresholds, $V_H$ 110 and $V_L$ 120, may be changed using a set of switches. By controlling the sequence and the duration of the on-time of the switches, the spurs in the output can be controlled and the amplitude in the frequency band of interest can be reduced. Additional spur reduction is possible by randomizing the control of the switches.

As provided above, when a DC-DC converter is run in hysteretic mode, the output contains harmonic content which is dependent on the load current, input voltage and output capacitance. The hysteresis can be dynamically varied, resulting in a spreading of the harmonic content over multiple frequencies but with lesser magnitude. Higher efficiency may be achieved by running in hysteretic mode without compromising RF performance. In many applications, the load may be as low as 200 micro amps and as high as 200 or 400 milliamps, for example. At a relatively low load of tens of milliamps, hysteretic mode may be a preferred mode of operation. In terms of efficiency, hysteretic mode offers the best performance. However, the spectral content in the output voltage of hysteretic mode of operation may present a challenge. In an application in which the spectral content is important, the mode of operation can be switched between hysteretic mode and PWM mode. Hysteretic mode is more efficient, but the spectrum of the PWM mode is more predictable. So in PWM mode, when the frequency is designed for 2 MHz, for example, the harmonics are predictable at 4 MHz, 6 MHz, 8 MHz, etc.

The DC-DC converter may be designed for PWM mode such that the spectral output of the DC-DC converter doesn't affect the RF output of the design. But when the operation of the converter draws much lower current, the output current, at 10 milliamps, for example, leads to inefficient performance. Under that condition, it may be preferable to be in PFM mode for the increased efficiency over the PWM mode. An improved converter would achieve the efficiency of the PFM mode during low power consumption periods and the predictable RF spectrum of the PWM mode during higher power consumption periods.

In PFM mode, the output spectrum is dependant on the output load. The output capacitor is charged and then allowed to discharge by the load. The DC-DC converter may be configured to stop switching until the output voltage drops to a particular level. Then the capacitor is charged again until a pre-determined threshold is reached, and the operation repeats itself. The efficiency of this operation is independent of the load current based on a discharged state of the output. The periodicity of the output is a function of the load current because it is dependant on a discharged time of the output. For example, during PFM mode, for a 20 milliamp load, the fundamental could be 100 KHz; but when the load becomes 40 milliamps, the fundamental could be at 200 KHz and so on to ensure that the RF performance is not affected in any way due to the changing nature of the output current.

The spectral output may be affected using multiple hysteretic levels with programmability. Additionally, the hysteresis levels may be controlled in a random fashion and/or into random sequences. To control or reduce the spurs associated with the fundamental frequency in the output ripple of the PFM controller, a control module may be used to control or to adjust the sequence and duration of the on-time. A control module is used to control the spurs in the output and to reduce the amplitude of the spurs and spread them in the frequency band. This is done by adjusting a set of switches or adjusting the sequence and the duration of the on-time of a set of switches between the output and hysteretic inputs of a comparator. The sequence and duration of the on-times may be substantially randomized to increase the spur reduction. The control of the switches may be performed by a digital controller, for example.

Figure 3:
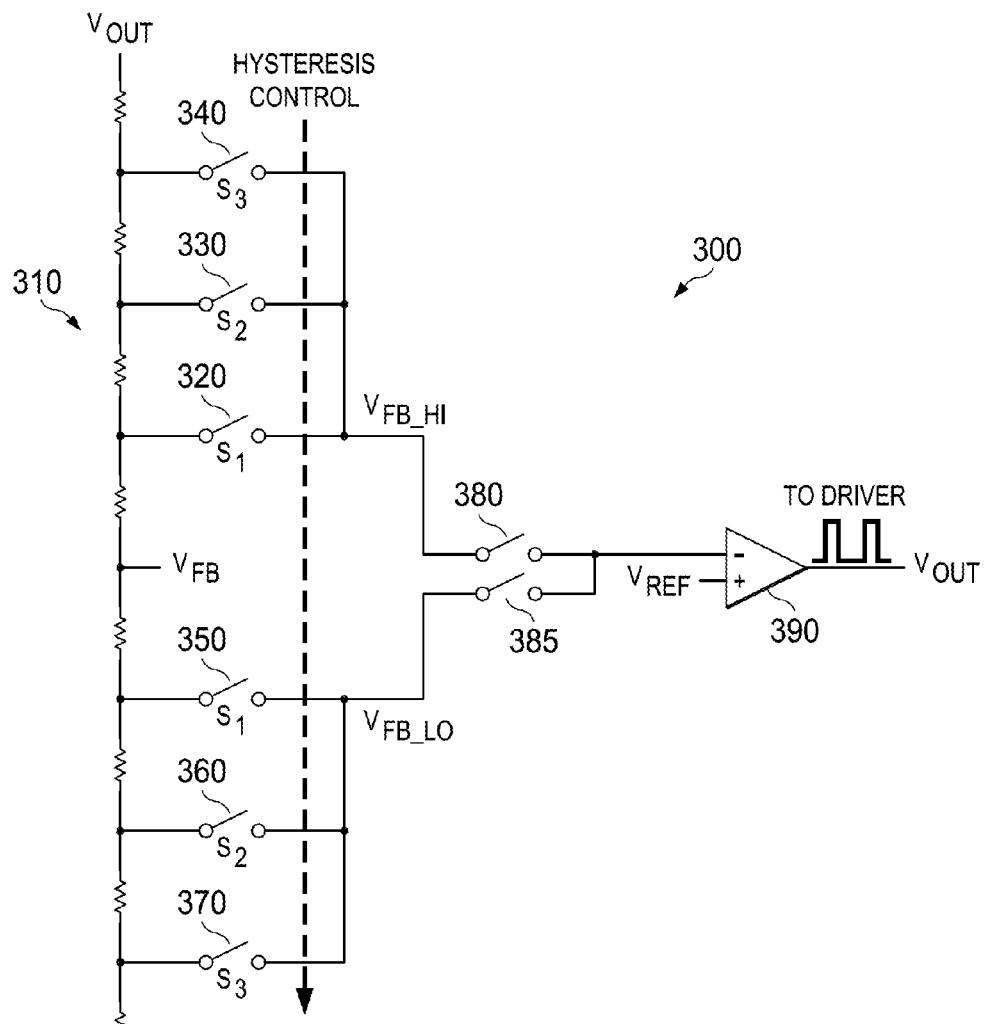
FIG. 3 is a circuit diagram of an example embodiment of a system of tone management in hysteretic mode DC-DC converters.

FIG. 3 provides circuit diagram 300 of an example embodiment of a system of tone management in a hysteretic mode DC-DC converter. Switches 380 and 385 on the inverting input of comparator 390 provides a reflection of the output voltage to be compared to a particular threshold as the reference voltage on the non-inverting input of the DC-DC converter. Switches 380 and 385 are controlled by the state of the output of comparator 390. Depending on the state of the output, the inverting input will either be VFB_HI through switch 380 or VFB_LO through switch 385 for comparator 390. The output should have fallen below a particular level before the output switching starts. So at this point, the output is monitored to determine if the output has fallen below the VFB_HI input. Once the output falls below VFB_HI, the inverting input of comparator 390 is switched over to VFB_LO. Then the output charges until the output reaches a particular value and the inverting input of comparator 390 is switched to VFB_HI. The inverting input of comparator 390 toggles back and forth in this manner. Switches S1 320, 350, S2 330, 360, and S3 340, 370 may be switched to vary the applicable resistors of resistor string 310 to produce varying levels of VFB_HI and VFB_LO, and in varying sequences to produce varying periods of VFB_HI and VFB_LO. These variations will automatically vary the output ripple.

Figure 4:
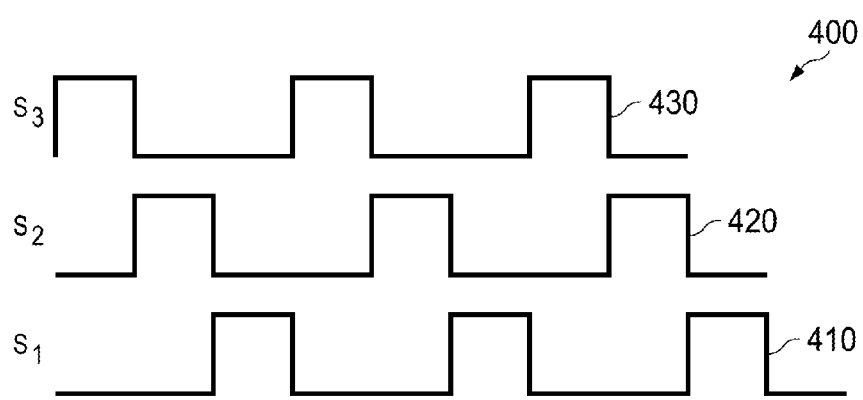
FIG. 4 is a signal diagram of an example embodiment of a switching sequence for the switches of FIG. 3.
Figure 5:
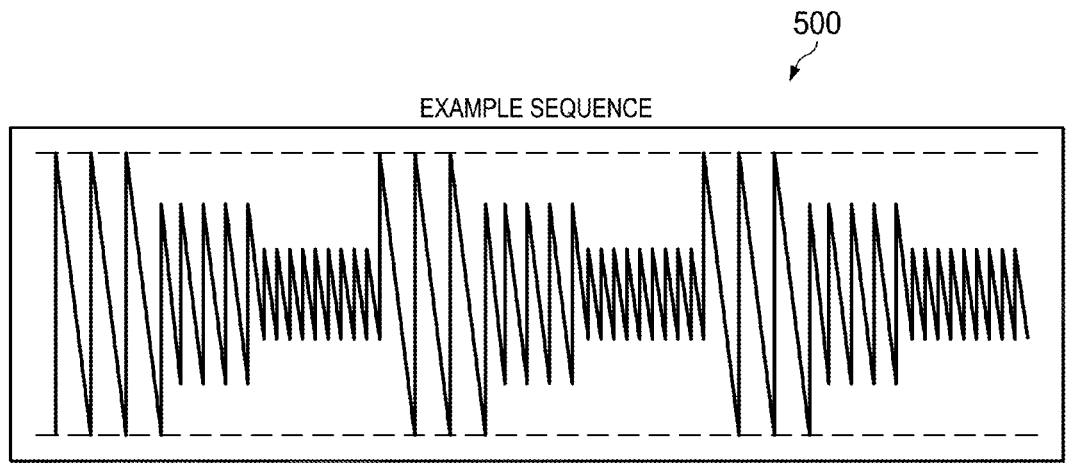
FIG. 5. Is a signal diagram of the converter output using the switching sequence of FIG. 4.

FIG. 4 provides regular sequence 400 for varying the levels of VFB_HI and VFB_LO with switches S1 320, 350, S2 330, 360, and S3 340, 370. In FIG. 4, S3 is closed and then opened; then S2 is closed and then opened; then S1 is closed and then opened. This regular sequence produces signal diagram 500 of the output of comparator 390 using the regular sequence provided in FIG. 4. However, in an alternative embodiment, more randomized sequencing and voltage levels may be used to achieve even better results. For example, S1 may be closed and then opened; then S3 may be closed and kept on a little longer; then S2 may be closed for a different time period, thereby varying and randomizing the sequence to produce a lower spectral tone on the output.

Figure 6:
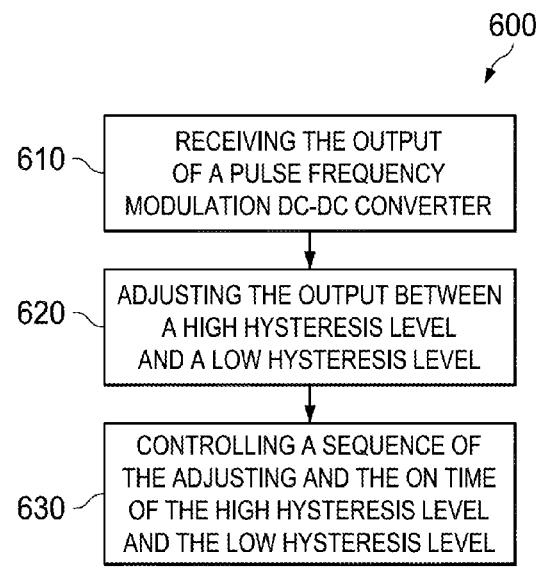
FIG. 6 is a flow diagram of a method of tone management in hysteretic mode DC-DC converters.

FIG. 6 provides flow diagram 600 of an example embodiment of a system of tone management in a hysteretic mode DC-DC converter. In block 610, the output of a pulse frequency modulation DC-DC converter is received. In block 620, the output is adjusted between a high hysteresis level and a low hysteresis level. In block 630, a sequence of the adjusting and the on-time of the high hysteresis level and the low hysteresis level are controlled. The controlling may be used to effect the spectral output of the hysteretic mode DC-DC converter. The method disclosed herein may be used with any topology that PFM may be used in.

The proposed methods and systems make hysteretic mode of DC-DC operations suitable for radio frequency loads. Therefore, efficiency and power delivery is improved without sacrificing RF performance. By randomizing the hysteretic control, it is possible to further reduce the spur level.

Although the present disclosure has been described in detail, it should be understood that various changes, substitutions and alterations can be made thereto without departing from the spirit and scope of the disclosure as defined by the appended claims.

Therefore, at least the following is claimed:

1. A pulse frequency modulated DC-DC converter comprising:
    (A) a comparator having an inverting input, a non-inverting input, and an output;
    (B) a reference voltage connected to the non-inverting input of the comparator;
    (C) a feedback high switch circuit having an input and having an output connected to the inverting input of the comparator;
    (D) a feedback low switch circuit having an input and having an output connected to the inverting input of the comparator;
    (E) a resistor divider network of individual resistances connected between the output of the comparator and circuit ground, the network having a first set of leads between individual resistances and a second set of leads between individual resistances, the second set of leads being separate from the first set of leads;
    (F) a first pair of switch circuits having inputs connected to the first pair of leads of the resistor divider network and having outputs, the output of one of the first pair of switch circuits being connected to the feedback high switch circuit input and the output of the other one of the first pair of switch circuits being connected to the feedback low switch circuit input; and
    (G) a second pair of switch circuits having inputs connected to the second set of leads of the resistor divider network and having outputs, the output of one of the second pair of switch circuits being connected to the feedback high switch circuit input and the output of the other one of the second pair of switch circuits being connected to the feedback low switch circuit input.

2. The converter of claim 1 in which the resistor divider network has a central feedback lead centrally located between the output of the comparator and circuit ground, and in which the input of the one of the first switch circuits and the input of the one of the second switch circuits is connected to the resistor divider network between the output of the comparator and the central feedback lead.

3. The converter of claim 1 in which the resistor divider network has a central feedback lead centrally located between the output of the comparator and circuit ground, and in which the input of the other one of the first switch circuits and the input of the other one of the second switch circuits is connected to the resistor divider network between the central feedback lead and the circuit ground.

4. The converter of claim 1 in which the a resistor divider network has a third set of leads between individual resistances and the third set of leads being separate from the first set of leads and the second set of leads, and including a third pair of switch circuits having inputs connected to the third set of leads of the resistor divider network and having outputs, the output of one of the third pair of switch circuits being connected to the feedback high switch circuit input and the output of the other one of the third pair of switch circuits being connected to the feedback low switch circuit input.

* * * * *